United States Patent
Jordan

(10) Patent No.: US 9,475,547 B2
(45) Date of Patent: Oct. 25, 2016

(54) DERAILLEUR WITH DAMPING ASSEMBLY

(76) Inventor: Brian Jordan, Chicago, IL (US)

(*) Notice: Subject to any disclaimer, the term of this patent is extended or adjusted under 35 U.S.C. 154(b) by 1195 days.

(21) Appl. No.: 13/367,081

(22) Filed: Feb. 6, 2012

(65) Prior Publication Data

US 2013/0203532 A1    Aug. 8, 2013

(51) Int. Cl.
*B62M 9/12* (2006.01)
*F16H 7/20* (2006.01)
*B62M 9/1248* (2010.01)

(52) U.S. Cl.
CPC .................................. *B62M 9/1248* (2013.01)

(58) Field of Classification Search
CPC ...... B62M 25/00; B62M 25/02; B62M 9/00; F16H 7/20
USPC ........................................................... 474/80
See application file for complete search history.

(56) References Cited

U.S. PATENT DOCUMENTS

| 4,406,643 | A | * | 9/1983 | Shimano | B62M 9/126 |
| | | | | | 474/80 |
| 4,850,940 | A | * | 7/1989 | Nagano | B62M 9/126 |
| | | | | | 474/80 |
| 5,397,275 | A | | 3/1995 | McJunkin | |
| 6,135,904 | A | * | 10/2000 | Guthrie | B62M 9/126 |
| | | | | | 474/82 |
| 6,350,212 | B1 | * | 2/2002 | Campagnolo | B62M 9/126 |
| | | | | | 474/80 |
| 7,371,199 | B2 | | 5/2008 | Joslyn | |
| 7,381,143 | B2 | * | 6/2008 | Matsumoto | B62M 11/06 |
| | | | | | 474/78 |
| 2004/0116222 | A1 | * | 6/2004 | Shahana | B62M 9/125 |
| | | | | | 474/82 |
| 2007/0021247 | A1 | | 1/2007 | Bohm et al. | |
| 2007/0219029 | A1 | † | 9/2007 | Turner | |
| 2008/0026890 | A1 | * | 1/2008 | Oseto | B62M 9/1242 |
| | | | | | 474/82 |
| 2008/0026891 | A1 | * | 1/2008 | Oseto | B62M 9/1242 |
| | | | | | 474/82 |
| 2009/0054183 | A1 | * | 2/2009 | Takachi | B62M 9/16 |
| | | | | | 474/80 |
| 2012/0083371 | A1 | * | 4/2012 | Yamaguchi | B62M 9/126 |
| | | | | | 474/80 |
| 2012/0083372 | A1 | | 4/2012 | Yamaguchi et al. | |

FOREIGN PATENT DOCUMENTS

EP    2128014 A1  † 12/2009

* cited by examiner
† cited by third party

*Primary Examiner* — William E Dondero
*Assistant Examiner* — Mark K Buse
(74) *Attorney, Agent, or Firm* — Milan Milosevic; Lisa Serdynski

(57) ABSTRACT

A bicycle rear derailleur including a base member and a movable member movably coupled to the base member. A chain guide assembly is rotatably connected to the movable member and a damper assembly is operatively disposed between the chain guide assembly and the movable member. The damper assembly includes a damper disposed in the movable member, and a one-way clutch disposed between the damper and the chain guide assembly. The one-way clutch is configured to permit damping when the chain guide assembly rotates in a first direction. The damper is disposed exteriorly of the one-way clutch.

38 Claims, 7 Drawing Sheets

DERAILLEUR WITH DAMPING ASSEMBLY

BACKGROUND OF THE INVENTION

This invention relates to derailleurs, and more particularly, to rear derailleurs with a damping assembly.

Many chain driven vehicles, such as road and off-road bicycles, for example, are equipped with a chain drive assembly including one or more chainrings attached to a crank and a rear wheel hub including a freewheel having a number of rear sprockets or cogs. Torque produced by a rider at the crank and chainrings is transmitted to the rear sprockets by a chain. The function of moving the chain from one of the rear sprockets to another of the rear sprockets is accomplished by a rear derailleur.

With respect to off-road bicycles, technological innovation, for example the prevalent use of active front and rear suspension, has permitted greater speeds over increasingly technical terrain. This has presented a challenge to chain drive assembly engineers at least with respect to prevention of chain malfunction. This challenge is especially seen in multi-geared bicycles that can experience severe changes in chain tension, primarily from riding over rough terrain.

The invention provides a drive chain management device, especially for a bicycle that can successfully and reliably be ridden over rough and challenging terrain.

SUMMARY OF THE INVENTION

One aspect of the invention provides a bicycle rear derailleur including a base member and a movable member movably coupled to the base member. A chain guide assembly is rotatably connected to the movable member and a damper assembly is operatively disposed between the chain guide assembly and the movable member. The damper assembly includes a damper disposed in the movable member, and a one-way clutch disposed between the damper and the chain guide assembly. The one-way clutch is configured to permit damping when the chain guide assembly rotates in a first direction. The damper is disposed exteriorly of or about the one-way clutch.

Other aspects of the invention provide a bicycle rear derailleur wherein the one-way clutch engages the chain guide assembly when the chain guide assembly rotates in the first direction. The damper may dampen between the one-way clutch and the movable member. The movable member may have a bore formed therein and the chain guide assembly includes a cage shaft rotatably disposed in the bore. The bore may be cylindrical. The damper may include an annular friction element configured to be received in the cylindrical bore, exteriorly of the one-way clutch. The annular friction element may be deformed to apply frictional damping between the one-way clutch and the movable member. The damper assembly may include an adjuster disposed in the movable member and deforming the annular friction element. The adjuster may be threadably engaged in the movable member and operable to vary the amount of frictional damping between the movable member and the one-way clutch. The adjuster may include a tool feature for permitting the operation of the adjuster with a tool. The bore may be at least partially tapered. The damper assembly may further include a sleeve disposed exteriorly of the one-way clutch and the damper includes a friction element disposed in the at least partially tapered bore exteriorly of the sleeve. The friction element may be annular and cone-shaped. The damper assembly may further include an adjuster disposed in the movable member and deforming the cone-shaped friction element. The adjuster may be threadably engaged in the movable member and operable to vary the amount of frictional damping between the movable member and the one-way clutch. The damper may be formed of a material having low stiction. The damper may be formed of one of polyethylene, UHMW PE, and polyoxymethylene. The one-way clutch may be a roller clutch. The derailleur may further include a biasing member that biases the chain guide assembly in a second direction opposite the first direction. The damper may directly contact the clutch.

Other aspects of the invention provide a bicycle rear derailleur, including a base member. A movable member is movably coupled to the base member. A chain guide assembly is rotatably connected to the movable member and a damper assembly is operatively disposed between the chain guide assembly and the movable member. The damper assembly includes a damper disposed in the movable member and a one-way clutch disposed between the chain guide assembly and the movable member. The damper assembly is configured to permit damping when the chain guide assembly rotates in a first direction, wherein the damper assembly is configured to be loaded in an axial direction to load the damper in a generally radial direction.

Yet other aspects of the invention provide a damper that may be disposed one of exteriorly and interiorly of the one-way clutch. The one-way clutch may engage the damper when the chain guide assembly rotates in the first direction. The damper may dampen between the movable member and the chain guide assembly. The movable member may have a bore formed therein and the chain guide assembly may include a cage shaft rotatably disposed in the bore. The bore may be cylindrical. The damper may include a friction element configured to be received in the cylindrical bore, between the one-way clutch and the cage shaft. The friction element may be deformed to apply frictional damping between the one-way clutch and the cage shaft. The damper assembly may include an adjustor threadably disposed on the cage shaft and operable to deform the friction element. The adjustor, which may be a nut, is operable to vary the amount of frictional damping. The derailleur may include a cap that is disposed in the movable member to enclose the damper assembly. The damper assembly may further include a friction element disposed about the cage shaft and a sleeve is disposed exteriorly of the friction element, the friction element and sleeve having corresponding tapered surfaces in facial engagement, and wherein the one-way clutch is disposed exteriorly of the sleeve.

These and other features and advantages of the present invention will be more fully understood from the following description of one or more embodiments of the invention, taken together with the accompanying drawings.

DETAILED DESCRIPTION OF THE PREFERRED EMBODIMENTS

Preferred embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "upper" and "lower," or "forward" and "rearward" are used for the sake of clarity and not as terms of limitation. Moreover, the terms preferably refer to the bicycle derailleur conventionally mounted to a bicycle and with the bicycle oriented for normal use unless otherwise indicated.

Figure 1:
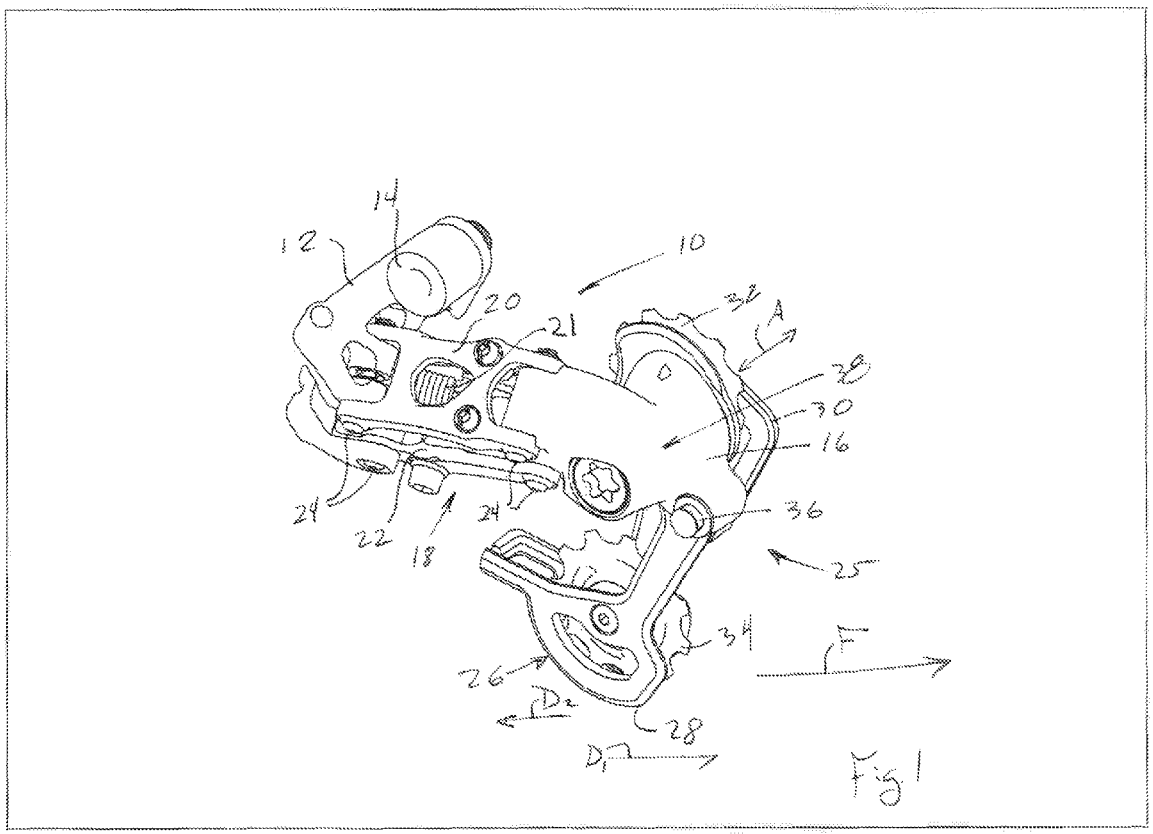
FIG. 1 is a perspective view of a rear derailleur including a damper assembly according to the invention.

FIG. 1 is a bicycle derailleur 10, which can incorporate any of the embodiments of the invention set out herein or can be adapted to incorporate any of the embodiments of the invention set out herein. The bicycle derailleur 10 generally includes a base member 12 and a linkage 18, also known as a parallelogram linkage. The linkage 18 may include two links 20, 22 pivotally connected at one end to the base member. A movable member 16 is pivotally connected to the linkage 18 at an end opposite the base member 12. A chain guide assembly 25 is rotatably attached to the movable member 16. The derailleur 10 includes a damper assembly 38, which damps rotational movement of the chain guide assembly 25 relative to the movable member 16.

The base member 12, which is also known as a b-knuckle, is attachable to a bicycle frame by way of a fastener 14, e.g., a bolt. A pair of pivots 24, which may be in the form of pins, pivotally attach the base member 12 to the linkage 18.

The linkage 18 includes an outer link 20 and an inner link 22. The linkage 18 includes a biasing member 21, for example a spring, for biasing the derailleur 10 towards an initial travel position, as is well known.

The movable member 16, which is also known as a p-knuckle, is rotatably attached to the linkage 18 by way of a pair of pivots 24, in a manner that is similar to the attachment of the base member 12 to the linkage. Other means of attaching the base member 12 to the movable member 16 are contemplated by the invention.

The chain guide assembly 25 includes a chain guide 26 with a pair of spaced cage plates, specifically an outer cage plate 28 and an inner cage plate 30. Rotatably interposed between the cage plates 28, 30 is a pair of guide wheels, specifically, an upper guide wheel 32 and a lower guide wheel 34 for guiding a chain (not shown). The upper and lower guide wheels 32, 34 are also known as pulleys or jockey wheels. The derailleur 10 is shown with a forward direction shown at "F." For purposes of the current application, the forward direction will also be referred to as the first direction $D_1$, or alternatively, a direction opposite a chain tensioning direction. A second direction $D_2$ will be understood to mean a direction opposite the first direction, or alternatively, a chain tensioning direction.

As shown in FIG. 1, the movable member 16 may include an optional cage lock mechanism 36, which is operable to fix the chain guide assembly 25 in position relative to the movable member 16.

Figure 2:
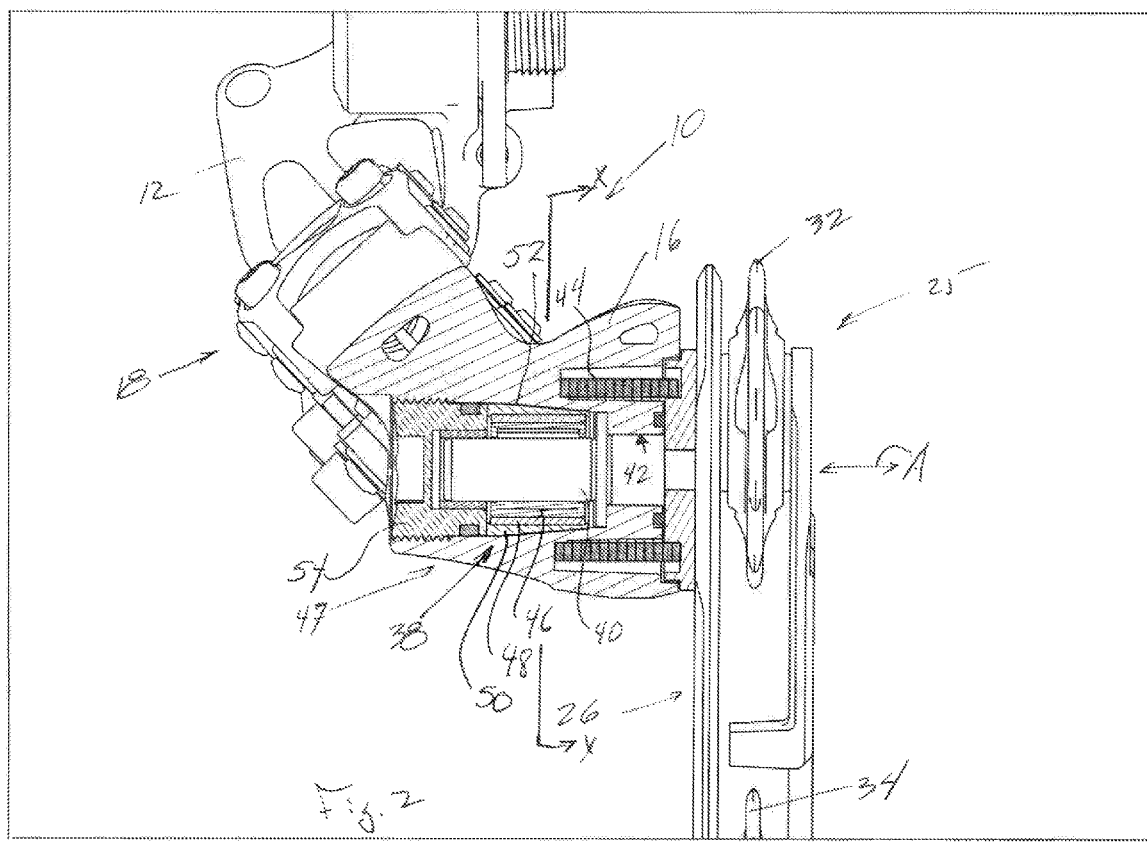
FIG. 2 is front view of a rear derailleur with a partial cross section taken through a damper assembly according to a first embodiment of the invention.

FIG. 2 is a sectional view of a derailleur 10 according to an embodiment of the invention including a damper assembly 38. The movable member 16 may be connected to the base member 12 by a linkage 18, the movable member thus being movable with respect to the base member. The chain guide assembly 25 includes a chain guide 26, also known as a chain cage, with an upper guide wheel or pulley 32, a lower guide wheel or pulley 34, and a cage shaft 40. The chain guide 26 is attached to and supported by the cage shaft 40. The cage shaft 40 is rotatably received in a bore 42 formed in the movable member 16.

A biasing member 44, which may be in the form of a torsion spring, is operatively disposed between the movable member 16 and the chain guide assembly 25. The biasing member 44 biases the chain guide assembly 25 in a direction so as to tension a chain (not shown) which is engaged in a standard manner with the guide wheels 32, 34. It will be understood that the chain guide assembly 25 is biased in a standard direction, i.e., clockwise in FIGS. 1, 4, and 5, about the axis A of the cage shaft 40. The chain guide assembly 25 also functions to take up additional chain slack created when smaller sprockets are selected, as is well known.

The damper assembly 38 includes a clutch 46, in the form of a one-way clutch, which may be disposed in the movable member 16 and exteriorly of or about the cage shaft 40. The clutch 46 is configured to engage or lock to the cage shaft 40 when the cage shaft is rotated in a counterclockwise direction $D_1$, which is a direction that is opposite the biasing direction $D_2$ of the biasing member 44. In this example, the one-way clutch 46 is a roller clutch, although other suitable types of clutches are well known, such as a ratchet and pawl clutch, for example.

The damper assembly 38 includes a damper 47. The damper 47, in this embodiment, includes an annular sleeve 48, which is disposed exteriorly of or about the clutch 46. The annular sleeve 48 may be attached to the one-way clutch. If attached, the annular sleeve 48 may be press-fit to the clutch 46, for example, and becomes rotationally fixed relative to the clutch. The damper 47 also includes a friction element 50, which is also annular and has a tapered or cone-shaped outer surface. The friction element 50 is disposed between the sleeve 48 and an at least partially tapered bore 52 formed in the movable member 16. The friction element 50 may be in the form of a tapered, continuous uninterrupted ring. The friction element 50 may also be provided with a slot to provide more radial compliance.

An adjuster 54 is disposed in the movable member 16 in position to contact and deform the friction element 50. In the embodiment of FIG. 2, the adjuster is threadably engaged in the movable member. The adjuster 54 may be inserted in the movable member to an extent that creates an axial force on the friction element 50 along axis "A," which forces the friction element into the tapered bore 52 and increases the radial contact force or frictional damping between the friction element and the adjacent sleeve 48. In this embodiment, the adjuster 54 can generate a variable radial force between the friction element 50 and the sleeve 48 by adjusting the position of the adjuster in the movable member 16. In this way, the frictional damping exerted by the damper 47 between the movable member and the clutch 46 can be preset and/or varied.

When the bicycle (not shown) absorbs an impact, it is well known that the chain (not shown) has a tendency to oscillate and become disengaged with the drive sprockets (not shown). When the chain attempts to oscillate, the chain guide assembly 25 tends to be pulled by the chain by the lower guide wheel 34 in a forward (i.e., counterclockwise)

direction F. This prompts the engagement of the one-way clutch 46. The sleeve 48, which is connected to the clutch 46, may be caused to slide against the friction element 50, providing resistance to rotation of the cage assembly 25 in the forward direction F. This resistance may be referred to as damping or frictional damping. Alternatively, the friction element 50 may slide in the movable member 16. It will be understood that the damper 47 includes the element(s) responsible for generating damping between the movable member 16 regardless of which elements of the damper move. Therefore, rotation of the cage is influenced or restricted by the combined function of the biasing member 44 and the damping of the damper assembly 38. Thus, the damper assembly 38 supplies damping to the movement of the chain guide assembly 25 and thus to the chain reducing the possibility that the chain will be caused to move in an undesired manner and potentially malfunction.

When the chain guide assembly 25 is caused to rotate in a rearward (i.e., clockwise) direction $D_2$ (see FIG. 1 and opposite of F) assisted by the effect of the bias from the biasing member 44, the one-way clutch 46 dis-engages and the chain guide assembly 25 is free to rotate rearward ($D_2$), biased only by the biasing member and is not restricted by the clutch 46 or damping of the damper 47.

Figure 3:
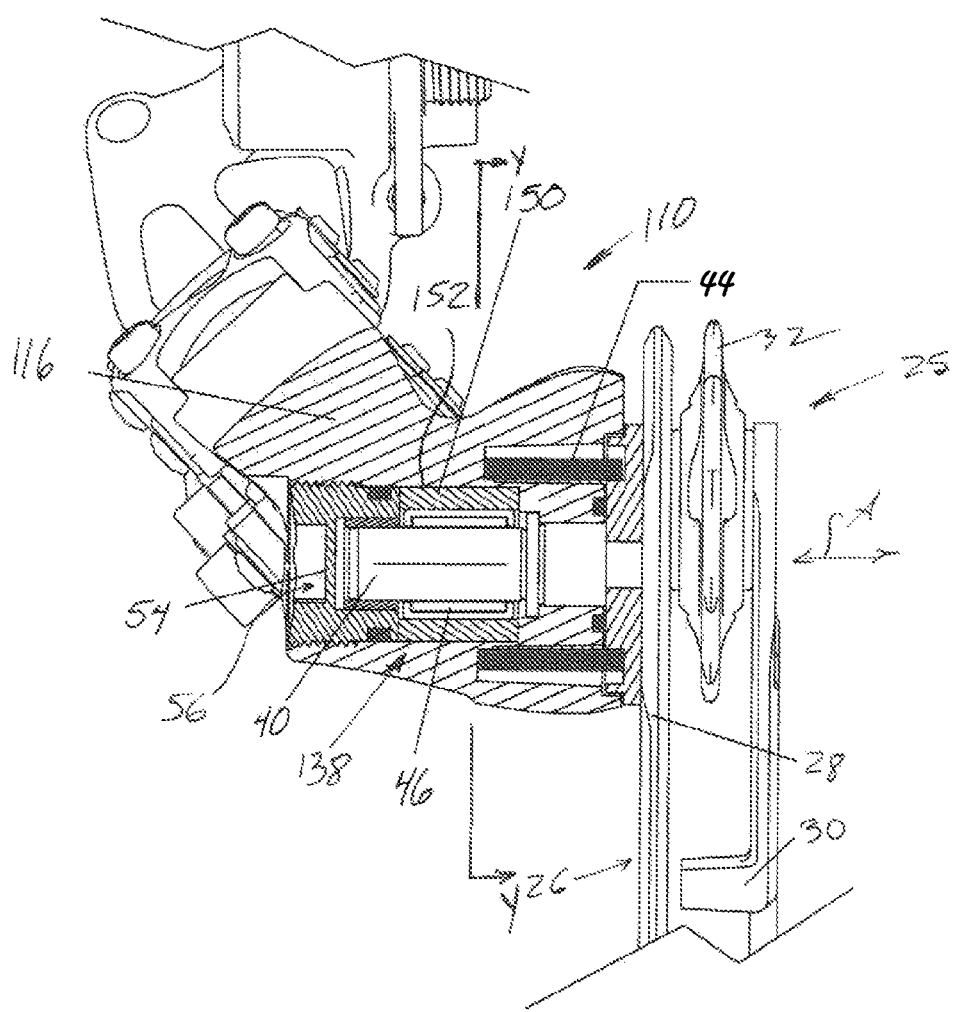
FIG. 3 is a front view of a rear derailleur with a partial cross section taken through a damper assembly according to a second embodiment of the invention.

FIG. 3 is an alternative embodiment of a derailleur 110 including a damper assembly 138 according to the invention, and shares the arrangement of the common parts with the embodiment of FIG. 2. Also, the derailleur 110 generally functions in a manner that is similar to that set out above.

In the embodiment of FIG. 3, the damper assembly 138 includes an annular friction element 150 that is disposed in a cylindrical bore 152 in the movable member 116, and between the movable member and exteriorly of or about a one-way clutch 46. The friction element 150 may be a one-piece annular element. An adjuster 54 is threadably engaged with the movable member 116 and positioned such that when it is advanced into the movable member an axial force is generated that tends to cause the friction element to deform. This increases the radial contact force on the one-way clutch 46, which increases the frictional damping generated by the damper assembly 138.

The adjuster 54 may include a tool feature 56, which may be in the form of a hex receptacle or slot, for example, for receiving a tool such as a hex wrench or screw driver for inserting the adjuster in the movable member 116. The position of the adjuster 54 may also be adjusted by way of the tool feature. Alternatively, the adjuster 54 can be permanent or non-adjustably disposed in the movable member 116 as will be detailed below.

A number of suitable materials may be utilized for the sleeve and/or friction elements detailed above, but a relatively low friction plastic is preferred because these materials tend to have a lower amount of stiction. Other preferred characteristics of the sleeve and/or the friction elements include high stiffness and dimensional stability. Some examples of these materials are polyethylene, UHMW plastic (such as UHMW PE), and polyoxymethylene.

Figure 4:
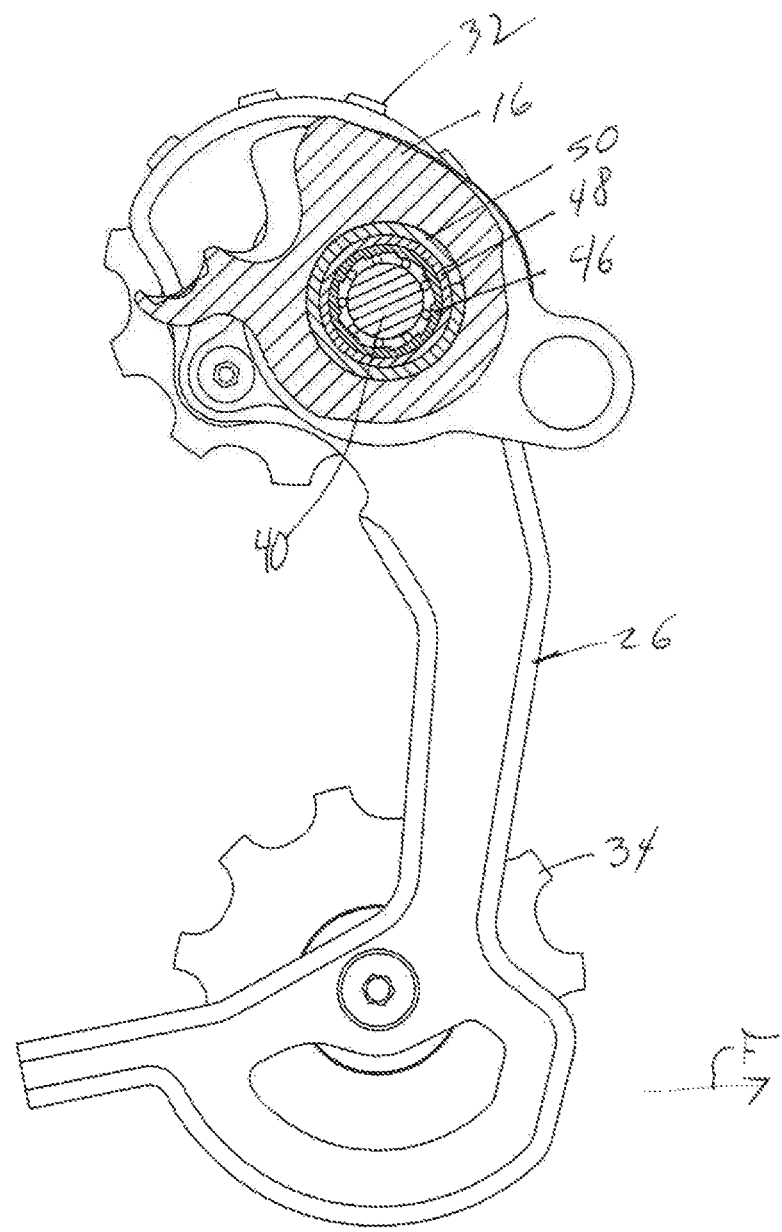
FIG. 4 is a side view of a rear derailleur with a cross section taken through lines X-X of FIG. 2.

FIG. 4 is the rear derailleur of FIG. 2 with a cross section taken through lines X-X. The cage shaft 40 is rotatably received within movable member 16. Positioned concentrically exterior to or about the cage shaft 40 is a one-way clutch 46. The clutch 46 is configured to engage and lock to the cage shaft 40 when the cage shaft rotates counterclockwise and to disengage when the cage shaft rotates clockwise (as in the figure).

An annular sleeve 48 is disposed exteriorly of or about the clutch 46 and may be attached thereto. In this embodiment, the sleeve 48 may move with the clutch 46.

A friction element 50 is concentrically disposed exteriorly of or about the sleeve 48. When the sleeve 48 moves, the friction element 50 may resist the movement of the sleeve. When the clutch 46 is disengaged, the friction between the friction element 50 and sleeve 48 is not transmitted through the clutch to the cage shaft 40 and the chain guide assembly 25 is permitted to move freely.

When the clutch 46 is engaged, the friction between the sleeve 48 and friction element 50 creates frictional damping of the movement of the cage shaft 40 and likewise resists the tendency of the pulley 34 to move in direction F in response to chain tension.

Figure 5:
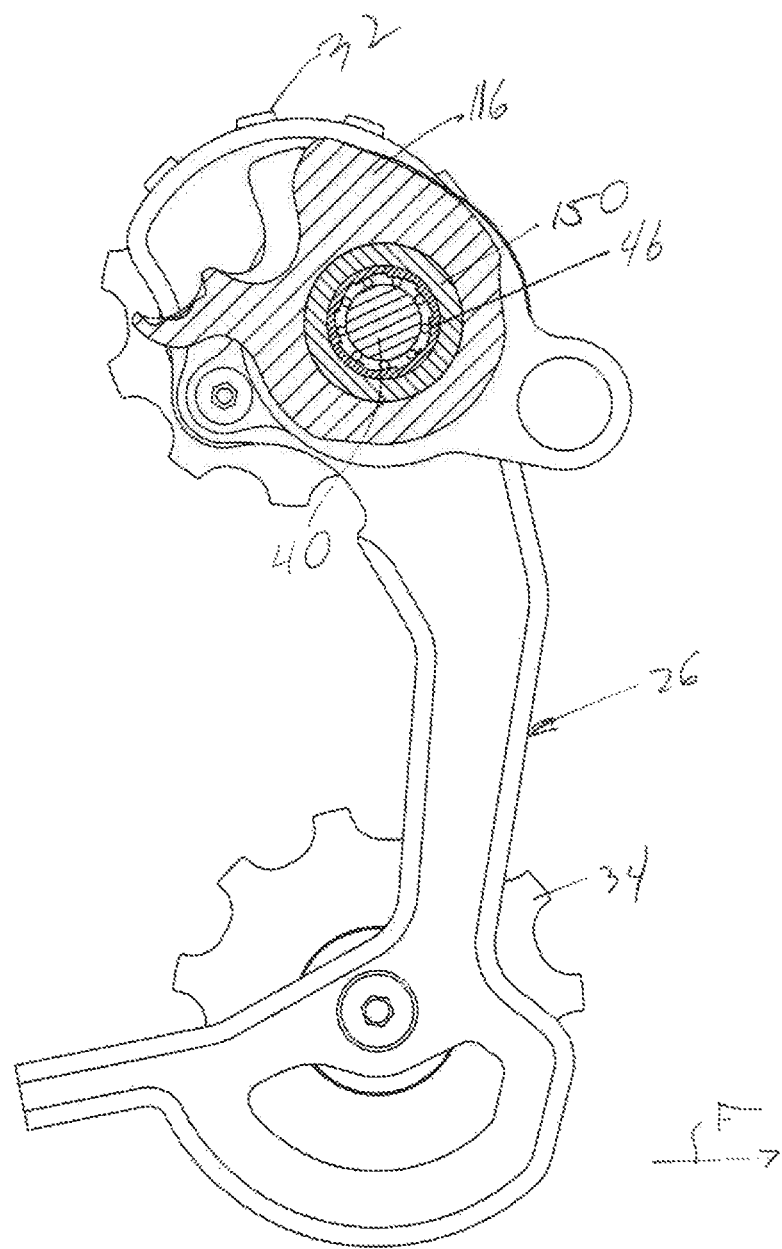
FIG. 5 is a side view of a rear derailleur with a cross section taken through lines Y-Y of FIG. 3.

FIG. 5 is the rear derailleur of FIG. 3 with a cross section taken through lines Y-Y. The cage shaft 40 is rotatably received within movable member 116. Positioned concentrically exteriorly of or about the cage shaft 40 is a one-way clutch 46. The clutch 46 is configured to engage when the cage shaft 40 rotates counterclockwise and to disengage when the cage shaft rotates clockwise. When engaged, the clutch 46 tends to lock to the shaft 40. When disengaged, the clutch 46 is not locked to the shaft 40.

An annular friction element 150 is concentrically disposed exteriorly of or about the clutch 46. When the clutch 46 is engaged and moves with the shaft 40, the friction element 150 damps the movement of the clutch, and thus the shaft. When the clutch 46 is disengaged, the friction between the friction element 150 and clutch 46 is not transmitted to the cage shaft 40 and the chain guide assembly 25 moves freely.

When the clutch 46 is engaged, the friction between the clutch 46 and friction element 150, or alternatively between the friction element and the movable member 116, generates an effective amount of frictional damping of the movement of the cage shaft 40 and likewise resists the tendency of the pulley 34 to move in direction F in response to chain tension.

Figure 6:
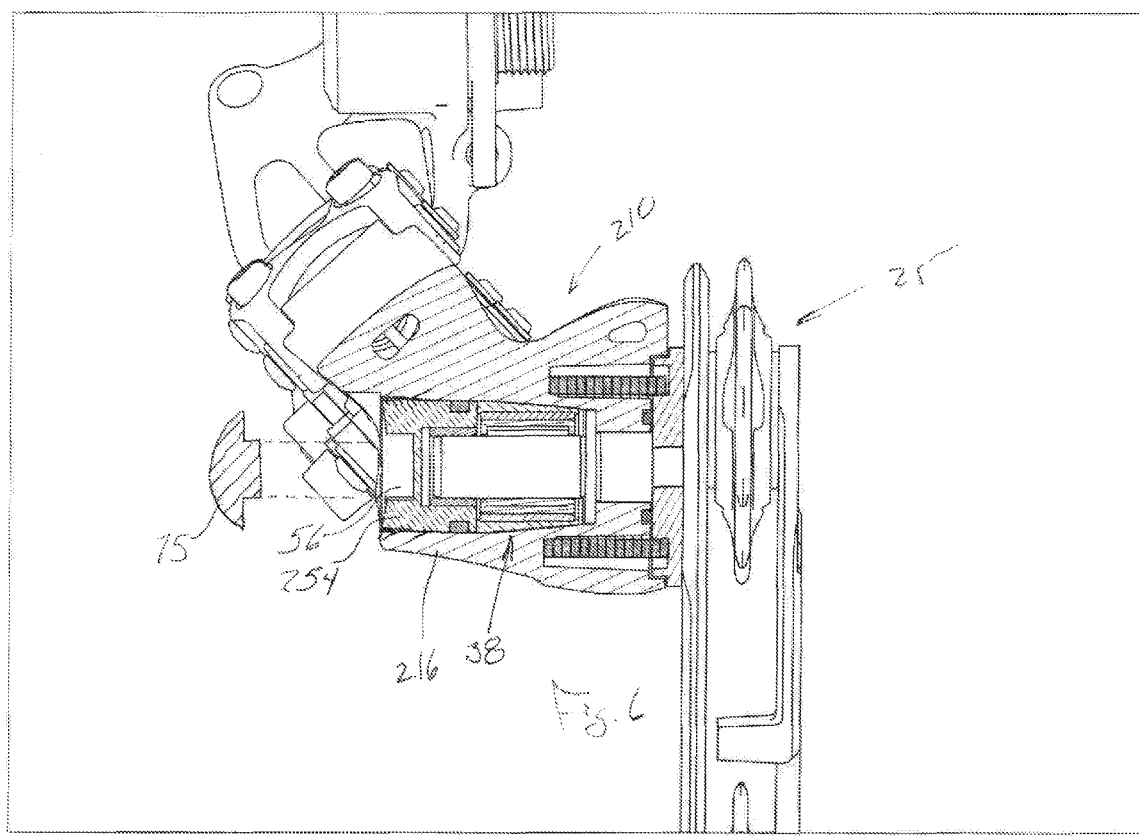
FIG. 6 is a front view of a rear derailleur with a partial cross section taken through a damper assembly according to another embodiment of the invention.

FIG. 6 is another embodiment of a derailleur according to the invention. The illustrated embodiment is generally similar to that detailed above in FIG. 2. Rear derailleur 210 includes a movable member 216 including a damper assembly 38. The damper assembly 38 interacts with the chain guide assembly 25 to provide frictional damping thereto in a predetermined manner and direction, as detailed above.

The illustrated derailleur 210 includes an adjuster 254, in the form of a cylindrical plug. Other shapes of caps are contemplated by the invention. The adjuster 254 may be non-adjustable and/or non removable. The adjuster 254 may be fixed into place in the movable member 216 by any suitable means, such as gluing, welding, or press-fit, for example. In this manner, the damper assembly 38 is protected from damage and contamination and the damper assembly 38 cannot be misadjusted or tampered with.

The adjuster 254 may include a tool feature 56, as described above, which may be disabled or plugged with a plug 75. The plug 75 may be glued into position, or press-fit, or otherwise fitted thereto. In one embodiment, the plug 75 is non-removably fitted into the tool feature 56, such that the adjuster 254 cannot be accessed or tampered with after the plug is fitted.

Figure 7:
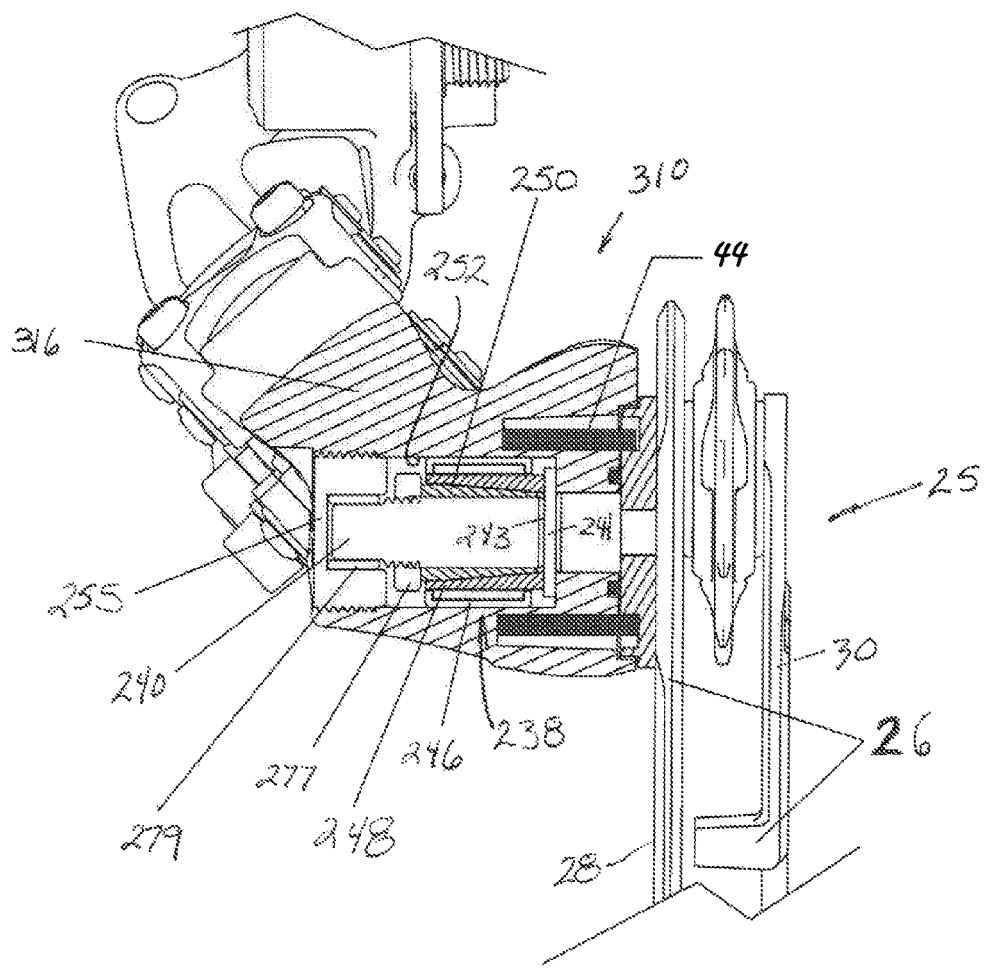
FIG. 7 is a front view of a rear derailleur with a partial cross section taken through a damper assembly according to yet another embodiment of the invention.

FIG. 7 is yet another embodiment of a derailleur 310 according to the invention. The illustrated embodiment is similar to that detailed above, at least with respect to the general structure and function of the derailleur. Rear derailleur 310 includes a movable member 316, a chain guide assembly 25 rotationally attached to the movable member, and a damper assembly 238 functionally operating between the movable member and the chain guide assembly to provide frictional damping thereto in a manner and direction similar to that detailed above.

The chain guide assembly 25 generally includes a chain cage 26 including a pair of spaced cage plates, i.e., an outer cage plate 28 and an inner cage plate 30. The chain guide assembly 25 includes a cage shaft 240 attached to the chain cage 26. The cage shaft 240 is disposed in a bore 252 formed in the movable member 316. The cage shaft 240 includes a flange 241, which functions to retain the cage shaft within the movable member and also provides an outer surface 243 that at least some of the components of the damper assembly 238 may contact.

The bore 252 contains the damper assembly 238. The damper assembly 238 includes a friction element 250 disposed exteriorly of or about the cage shaft 240. The friction element 250 is in the form of a cone or wedge shape with the incline oriented on the outside of the friction element 250. The friction element 250 may be made of a low stiction plastic as detailed above. A sleeve 248 is disposed exteriorly of or about and in contact with the friction element 250. The sleeve 248 has a corresponding shape to contact and conform to the outside of the friction element 250. In particular, the sleeve 248 is cone shaped with the incline formed on the inside of the sleeve to cooperate with the outside of the friction element 250. The sleeve 248 may be made of steel or a metal, or any suitable material.

A one-way clutch 246 is disposed exteriorly of or about the sleeve 248 and configured to permit damping when the chain guide assembly 25 rotates in a first direction. The one-way clutch 246 may be a roller clutch.

An adjustor 277, which may be a nut, is threadably disposed on the cage shaft 240 and in a position to provide an axial force on one of the sleeve 248 and friction element 250, by compressing the sleeve and friction element between the nut and the flange 241. Due to the cooperating cone or wedge shapes of the sleeve 248 and friction element 250, the sleeve and friction element are urged together in the axial direction by the adjustor 277 which, in turn, generates a corresponding load or force in the radial direction. The radial force between the sleeve 248 and friction element 250 provide the frictional damping of the damping assembly 238. The adjustor 277 can be used to adjust the amount of force generated and thus, the damping effect of the damping assembly 238 can be preset and then rendered non-adjustable or the derailleur can be fitted with an access thereto so that the adjustor can be reached and adjusted as desired after assembly. To this end, a cap 255 may threadably or permanently engaged in the movable member 316 to close the bore 252 and enclose the components of the damper assembly 238. The cap 255 may include a shaft bearing 279 to support the cage shaft 240. The cap 255 may be fixed into place in the movable member 316 by any suitable means, such as gluing, welding, or press-fit, for example, or be made removable. With the cap 255 protecting the internal components of the damper assembly 238, the assembly is protected from damage and contamination. Removal of the cap 255 permits access to the adjustor 277 and other components of the damper assembly 238.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A bicycle rear derailleur, comprising:
   a base member;
   a movable member movably coupled to the base member;
   a chain guide assembly rotatably connected to the movable member; and
   a damper assembly operatively disposed between the chain guide assembly and the movable member, the damper assembly including:
      a damper disposed in the movable member, and
      a one-way clutch disposed between the damper and the chain guide assembly, the one-way clutch configured to permit damping when the chain guide assembly rotates in a first direction, the damper disposed exteriorly of the one-way clutch.

2. The bicycle rear derailleur of claim 1, wherein the one-way clutch engages the chain guide assembly when the chain guide assembly rotates in the first direction.

3. The bicycle rear derailleur of claim 2, wherein the damper dampens between the one-way clutch and the movable member.

4. The bicycle rear derailleur of claim 1, wherein the movable member has a bore formed therein and the chain guide assembly includes a cage shaft rotatably disposed in the bore.

5. The bicycle rear derailleur of claim 4, wherein the bore is cylindrical.

6. The bicycle rear derailleur of claim 5, wherein the damper includes an annular friction element configured to be received in the cylindrical bore, and received exteriorly of the one-way clutch.

7. The bicycle rear derailleur of claim 6, wherein the annular friction element is deformed to apply frictional damping between the one-way clutch and the movable member.

8. The bicycle rear derailleur of claim 7, wherein the damper assembly further includes an adjuster disposed in the movable member and deforming the annular friction element.

9. The bicycle rear derailleur of claim 8, wherein the adjuster is threadably engaged in the movable member and operable to vary the amount of frictional damping between the movable member and the one-way clutch.

10. The bicycle rear derailleur of claim 9, wherein the adjuster includes a tool feature for permitting the operation of the adjuster with a tool.

11. The bicycle rear derailleur of claim 4, wherein the bore is at least partially tapered.

12. The bicycle rear derailleur of claim 11, wherein the damper assembly further includes a sleeve disposed exteriorly of the one-way clutch and the damper includes a friction element disposed in the at least partially tapered bore exteriorly of the sleeve.

13. The bicycle rear derailleur of claim 12, wherein the friction element is annular and cone-shaped.

14. The bicycle rear derailleur of claim 13, wherein the damper assembly further includes an adjuster disposed in the movable member and deforming the cone-shaped friction element.

15. The bicycle rear derailleur of claim 14, wherein the adjuster is threadably engaged in the movable member and operable to vary the amount of frictional damping between the movable member and the one-way clutch.

16. The bicycle rear derailleur of claim 1, wherein the damper is formed of a material having low stiction.

17. The bicycle rear derailleur of claim 16, wherein the damper is formed of one of polyethylene, UHMW PE, and polyoxymethylene.

18. The bicycle rear derailleur of claim 1, wherein the one-way clutch is a roller clutch.

19. The bicycle rear derailleur of claim 1, further including a biasing member that biases the chain guide assembly in a second direction opposite the first direction.

20. The bicycle rear derailleur of claim 1, wherein the damper directly contacts the one-way clutch.

21. The bicycle rear derailleur of claim 1, wherein the damper assembly is configured to be loaded in an axial direction to load the damper in a generally radial direction.

22. A bicycle rear derailleur, comprising:
a base member;
a movable member movably coupled to the base member;
a chain guide assembly rotatably connected to the movable member; and
a damper assembly operatively disposed between the chain guide assembly and the movable member, the damper assembly including:
a damper disposed in the movable member, and
a one-way clutch disposed between the chain guide assembly and the movable member and configured to permit damping when the chain guide assembly rotates in a first direction, wherein the damper assembly is configured to be loaded in an axial direction to load the damper in a generally radial direction.

23. The bicycle rear derailleur of claim 22, wherein the damper is disposed one of exteriorly and interiorly of the one-way clutch.

24. The bicycle rear derailleur of claim 23, wherein the one-way clutch engages the damper when the chain guide assembly rotates in the first direction.

25. The bicycle rear derailleur of claim 24, wherein the damper dampens between the movable member and the chain guide assembly.

26. The bicycle rear derailleur of claim 22, wherein the movable member has a bore formed therein and the chain guide assembly includes a cage shaft rotatably disposed in the bore.

27. The bicycle rear derailleur of claim 26, wherein the bore is cylindrical.

28. The bicycle rear derailleur of claim 27, wherein the damper includes a friction element configured to be received in the cylindrical bore, between the one-way clutch and the cage shaft.

29. The bicycle rear derailleur of claim 28, wherein the friction element is deformed to apply frictional damping between the one-way clutch and the cage shaft.

30. The bicycle rear derailleur of claim 29, wherein the damper assembly further includes an adjuster threadably disposed on the cage shaft and operable to deform the friction element.

31. The bicycle rear derailleur of claim 30, wherein the adjuster is operable to vary the amount of frictional damping.

32. The bicycle rear derailleur of claim 26, wherein the derailleur includes an adjuster that is disposed in the movable member to enclose the damper assembly.

33. The bicycle rear derailleur of claim 26, wherein the damper assembly further includes a friction element disposed exteriorly of the cage shaft and a sleeve disposed exteriorly of the friction element, the friction element and sleeve having corresponding tapered surfaces in facial engagement, and wherein the one-way clutch is disposed exteriorly of the sleeve.

34. The bicycle rear derailleur of claim 22, wherein the damper is formed of a material having low stiction.

35. The bicycle rear derailleur of claim 34, wherein the damper is formed of one of polyethylene, UHMW PE, and polyoxymethylene.

36. The bicycle rear derailleur of claim 22, wherein the one-way clutch is a roller clutch.

37. The bicycle rear derailleur of claim 22, further including a biasing member that biases the chain guide assembly in a second direction opposite the first direction.

38. The bicycle rear derailleur of claim 22, wherein the damper directly contacts the one-way clutch.

* * * * *